Dec. 28, 1965  N. BATTISTONE  3,225,494
FIXTURE FOR GRINDING MACHINE TOOLS
Original Filed June 6, 1962  2 Sheets-Sheet 1
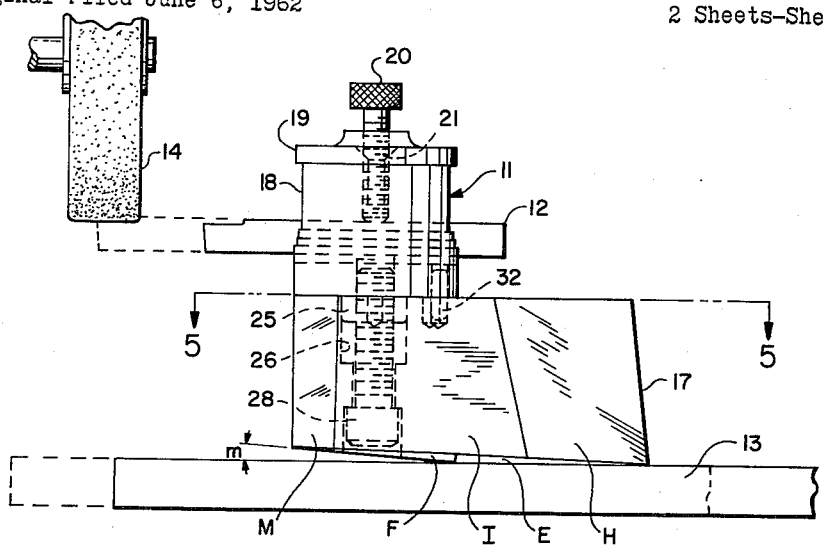
FIG.—1
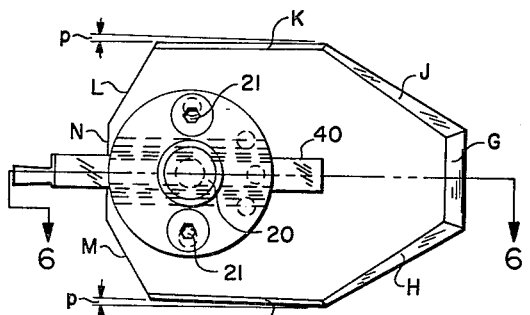
FIG.— 2
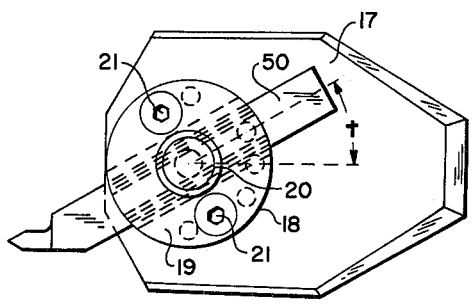
FIG.— 3
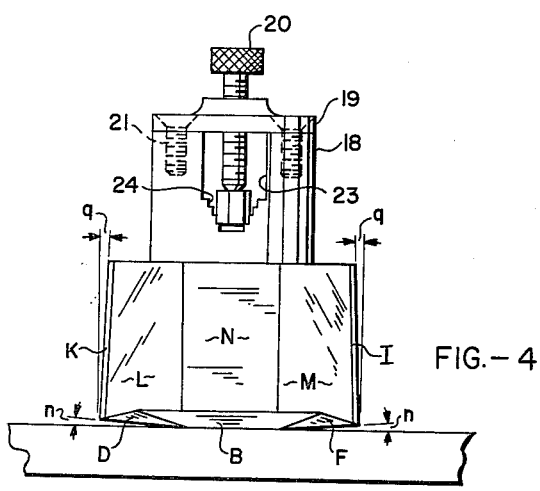
FIG.— 4
INVENTOR.
NICK BATTISTONE
BY *Watts + Fisher*
ATTORNEY Dec. 28, 1965  N. BATTISTONE  3,225,494
FIXTURE FOR GRINDING MACHINE TOOLS
Original Filed June 6, 1962

INVENTOR.
NICK BATTISTONE
BY Watts + Fisher
ATTORNEY

United States Patent Office 3,225,494
Patented Dec. 28, 1965

3,225,494
FIXTURE FOR GRINDING MACHINE TOOLS
Nick Battistone, 16026 St. Clair Ave., Cleveland 10, Ohio
Continuation of application Ser. No. 200,490, June 6, 1962. This application Oct. 29, 1963, Ser. No. 320,606
18 Claims. (Cl. 51—220)

The present application is a continuation of an earlier application, Serial No. 200,490, filed June 6, 1962, now abandoned.

The present invention relates generally to cutting tools and more particularly to fixtures for holding the tools for grinding and sharpening.

Grinding the face and flank surfaces of a cutting tool into a point while the tool is being held by hand not only requires an exceptionally skilled craftsman, but also a great deal of time. The cutting tool must be positioned relative to the grinding wheel to form the proper rake, relief and clearance angles and then fixedly held in each such position during the grinding or sharpening process. This requires not only a steady and firm hand, but also a great deal of patience and fortitude.

To eliminate some of the guesswork, especially for the unskilled person, several tool holders have been proposed for positioning a cutting tool against a grinding wheel in the several positions necessary to grind each of the point surfaces. However, most of the prior tool holders are quite intricate and are still beyond the comprehension of the unskilled user. Moreover, they often do not provide all of the positions necessary to grind every cutting tool one may desire to use. Finally, substantially all of the prior tool holders are too expensive for the home do-it-yourselfer or even for the average machinist as a part of his tool kit.

The present invention provides a tool fixture wherein all the necessary positions of the cutting tool relative to the grinding wheel are quickly obtained by merely repositioning the tool fixture on a magnetic chuck to which it is firmly clamped. The present tool fixture has no moving or rotating parts to set. Once fixed to the tool fixture, the cutting tool does not move relative thereto but is accurately positioned relative to the grinding wheel by repositioning the tool fixture on the magnetic chuck.

The tool fixture of the present invention includes a base member and a cutting tool clamping member removably secured to the base member. The base member is provided with a plurality of bottom, side, and end surfaces. The cutting tool is held by the clamping member parallel to the centerline of the base member and with the cutting tool base parallel to one of the bottom surfaces of the base member. In addition to a first bottom surface, there are several other bottom surfaces, each individually defining a plane at an angle to the plane defined by such first bottom surface. In use one of these bottom surfaces is selected and the tool fixture is clamped against the magnetic chuck by this surface. When finished the face of the point of the tool will be parallel to the selected surface. The side and end surfaces of the base member correspond to the side and end flank surfaces of the point of the tool to be ground. The base member is alternately clamped against the magnetic chuck by selected ones of the side and end surfaces so that the desired angles are formed when the side and end flank surfaces are ground.

The invention further contemplates that the tool clamping member may be secured on the base member with the cutting tool at a predetermined angle to the centerline of the base member. In this position, a bent tool is ground when the base member is clamped successively to the magnetic chuck by selected ones of its bottom, side, and end surfaces as each tool surface is ground.

The tool fixture of the present invention eliminates all guesswork in positioning the cutting tool at the proper grinding angle relative to the grinding wheel. A relatively unskilled person can be trained to use the tool grinding fixture with very little training. The user would only have to be told which surfaces of the base member are to be used and their order of use. He would not necessarily have to even understand the significance or purpose of each surface on the base member that he uses.

Accordingly, an object of the present invention is to provide a new and improved tool grinding fixture wherein the necessary grinding positions of the cutting tool are obtained by merely repositioning the base of the tool fixture against a magnetic chuck.

Another object of the present invention is to provide a new and improved tool grinding fixture adapted to be held against a magnetic chuck wherein the base portion of the tool fixture is provided with a plurality of surfaces, each surface relating to an angle to be ground into the point of the cutting tool. Still another object of the present invention is to provide a new and improved tool grinding fixture adapted to be held by a magnetic chuck wherein all the tool point surfaces and angles may be ground without moving the cutting tool relative to the tool grinding fixture.

Yet another object of the present invention is to provide a new and improved tool grinding fixture which may be used to grind or sharpen either a regular cutting tool to be directly secured in the tool clamp of a lathe or a cutting tool having the proper point surfaces so that it may be held by an angle tool holder when secured in the tool clamp of the lathe wherein the procedure to grind or sharpen the point of the latter cutting tool is the same as that required for grinding or sharpening the point surfaces of the former cutting tool.

Other objects and a fuller understanding of the invention may be had by referring to the following description and claims taken in conjunction with the accompanying drawings in which:

FIGURE 1 is an elevational view of the tool grinding fixture of the invention in position for grinding the face surface of the tool point;

FIGURE 2 is a top view of the tool grinding fixture of the invention with the clamping member positioned for grinding a straight tool;

FIGURE 3 is a top view, similar to FIGURE 2, but with the clamping member positioned for grinding a bent tool;

FIGURE 4 is a front view of the tool fixture of FIGURE 1;

Figure 8:
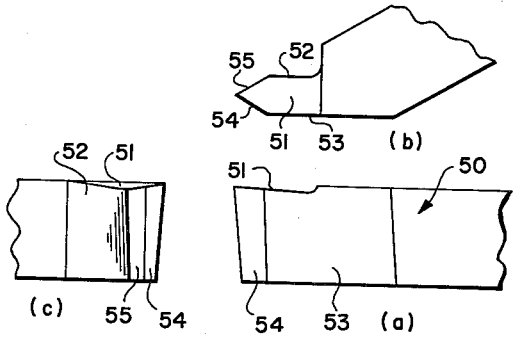
Figure 9:
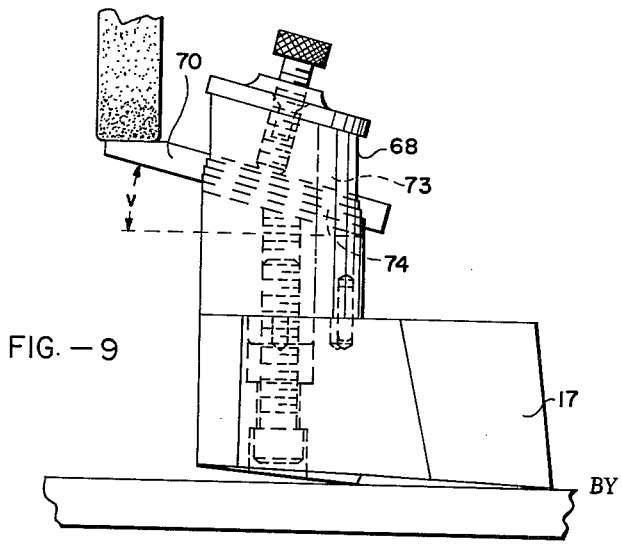

FIGURES 7a, b, and c show the side top, and end views, respectively, of a straight cut-off and grooving tool;

FIGURES 8a, b, and c show the side, top, and end views, respectively, of a bent threading tool; and, FIGURE 9 is a side elevational view of the tool grinding fixture of the invention having an alternate form of the clamping member for grinding a cutting tool to be used with a 14° angle tool holder.

Referring now to the drawings which illustrate a preferred form of the invention, there is shown in FIGURE 1 a tool grinding fixture 11. A cutting tool 12 is rigidly fixed to the tool grinding fixture 11. The tool grinding fixture 11 is magnetically clamped to a magnetic chuck represented by the surface 13. The magnetic chuck 13 is movable horizontally to cause the cutting tool 12 to engage a rotating grinding wheel 14. As the cutting tool is fed into the grinding wheel, a surface is ground therein; the particular tool surface ground being determined by the angular position of the tool fixture 11 relative to the magnetic chuck and to the grinding wheel. The grinding wheel 14 is vertically adjustable to set the depth of the surface ground on the cutting tool 12.

The tool fixture 11 includes a base member 17 and a clamping member 18. The clamping member 18 includes a plate 19 and a clamping screw 20. The clamping plate 19 is secured to the clamping member 18 by screws 21.

The clamping member 18 includes an inner machine tool receiving passageway 23. The passageway 23 is stepped throughout its entire length at both sides of its lower portion 24 to accommodate cutting tools of different widths. The clamping screw 20 firmly clamps the cutting tool 12 to the appropriate pair of steps in the passageway 23 of the clamping member 18.

Figure 6:
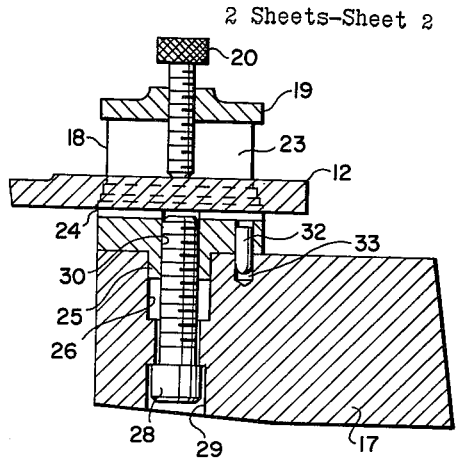
FIGURE 6 is a sectional view taken along line 6—6 of FIGURE 2.

The clamping member 18 also includes a lower collar 25 (FIGURE 6) which is slidably received in a counterbore portion 26 of the base member 17. A locking screw 28 extends through a bore portion 29 of the base member 17 and engages an internally threaded portion 30 of the collar 25.

A locating pin 32 is provided and protrudes from the underside of the clamping member 18. The locating pin 32 is received in one of several locating holes 33–37 in the top surface of the base member 17. As shown in FIGURES 1, 2, and 4–6, the locating pin 32 is in locating hole 33 so that the cutting tool 12 is aligned with the centerline of the base member 17. The position of the clamping member 18 is changed relative to the base member 17 by loosening the locking screw 28 until the locating pin is clear of the locating hole 33. The clamping member 18 may be then rotated relative to the base member 17 until the locating pin 32 is aligned with another locating hole, for example, locating hole 34. The locking screw 28 is then tightened to rigidly secure the clamping member 18 to the base member 17. In this position the cutting tool 12 is at an angle to the centerline of the base member 17. This position is shown in FIGURE 3 where the cutting tool 12 is in a 30° angle grinding position. If the locating pin 32 is in the locating hole 35, the cutting tool 12 is orientated at 90° relative to the centerline of the base member 17. The locating holes 36, 37 correspond to locating holes 34, 35 respectively and are used to locate the cutting tool in its opposite hand position from that provided by the locating holes 34, 35. Other locating devices may be used in place of the locating pin 32 and holes 34–37. For example, a spring biased ball or other detent may be used to locate the clamping member.

Figure 7:
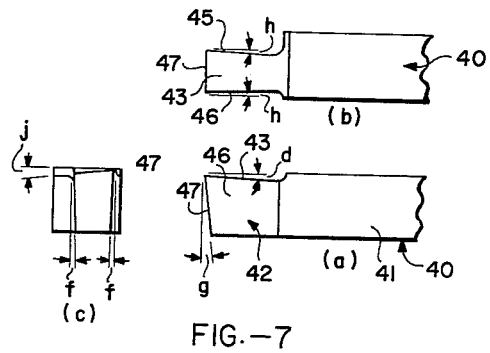

FIGURES 7 and 8 illustrate two of the many cutting tools which can be quickly made with the tool fixture of the present invention. FIGURE 7 shows a cut-off and grooving tool 40. The cut-off tool 40 includes a shank 41 and a point 42. The point 42 is all that part of the tool which is shaped to produce the cutting edges and the face. A top surface of the point is ground to provide a face 43. When the cut-off tool 40 is being used to machine a workpiece, the chips cut from the workpiece impinge on the face 43. An edge portion of the face 43 along which the chips are separated from the workpiece is termed the "tool cutting edge."

An angle $d$ (FIGURE 7a) between the face 43 and a line parallel to the centerline of the point and at right angles to the base is termed the "back-rake angle." An angle $j$ (FIGURE 7c) between the face 43 and a line parallel to the base of the tool 40 measured in a plane at right angles to the base and at right angles to the centerline of the point is termed the "side-rake angle."

The surfaces of the point 42 below and adjoining the face 43 are the flank of the point and include side flank surfaces 45, 46 and an end flank surface 47. An angle $f$ (FIGURE 7c) between the portion of the flank immediately below the cutting edge and a line drawn through this cutting edge perpendicular to the base of the tool measured in a plane at right angles to the centerline of the point 42 is termed the "side-relief angle."

An angle $g$ (FIGURE 7a) between the end flank surface 47 and a line drawn through the cutting edge perpendicular to the base of the shank 41 measured in a plane parallel to the centerline of the point 42 is termed the "end-relief angle." An angle $h$ (FIGURE 7b) between the side flank surface and a line parallel to the centerline of the point measured in a plane parallel to the base of the tool and parallel to the centerline of the point is termed the "side-clearance angle."

A bent threading tool 50 is shown in FIGURE 8. The point of the threading tool 50 includes a face 51, side flank surfaces 52, 53 and end flank surfaces 54, 55. The cutting edge of the tool is formed where the face 51 adjoins the end flank surfaces 54, 55. The rake, relief and clearance angles of the tool 50 correspond generally to those of cut-off tool 40.

The base member 17 is provided with several bottom surfaces A–F, end surfaces G, N and several side surfaces H–M. The face and flank surfaces of the point of both the straight tool 40 and the bent tool 50 are ground at their respective rake, relief and clearance angles by alternately clamping the base member 17 to the magnetic chuck 13 by certain of the surfaces A–N. First, one of the bottom surfaces A–F is clamped against the magnetic chuck to position the cutting tool blank for grinding the face of the point at the desired back and side rake angles. Second, both of the side surfaces K, I are alternately clamped, first one and then the other, against the magnetic chuck to position the tool to grind the side flank surfaces of the point at the desired clearance and side relief angles. Finally, if the square cut-off and grooving tool 40 is desired, the end surface G is clamped against the magnetic chuck to position the tool for grinding the end flank surface 47 at its particular end-relief angle. However, if a pointed threading tool is desired, the side surfaces H, J are alternately clamped against the magnetic chuck to position the tool for grinding the end flank surfaces 54, 55.

Figure 5:
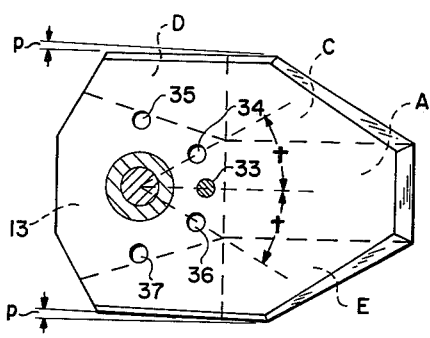
FIGURE 5 is a sectional view taken along line 5—5 of FIGURE 1 showing the bottom surfaces of the base member by broken lines.

The bottom surfaces A–F of the base member are shown in FIGURE 5 by broken lines as would be viewed from the top of the base member 17. The surface A is parallel to the top surface of the base member 17 and is parallel to the base of a cutting tool secured in the clamping member 18. If the tool grinding fixture 11 is attached to the magnetic chuck 13 by the surface A, both the side and back rake angles of the face ground in the cutting tool will be 0°. This is the tool grinding fixture position shown in FIGURE 1. The surface B makes an angle $m$ to the plane defined by the surface A (FIGURE 1). If the base member 17 is clamped to the magnetic chuck 13 by the surface B, the back-rake angle $g$ ground in the tool point will be the angle $m$.

The bottom surface C makes an angle $n$ to the plane defined by the surface A. If the base member 17 is clamped to the magnetic chuck 13 by the surface C, the side-rake angle will be the angle $n$ and the back-rake angle of the face will be 0°. The surface E corresponds to the surface C but slopes in the opposite direction to correspondingly provide an oppositely sloping side-rake angle. Whether the slope of the surface C or the slope of the surface E is used will depend on whether the metal chips are to move to the right or to the left after being cut from the workpiece.

The bottom surface D slopes both at the angle $m$ of surface B and at the angle $n$ of surface C relative to the plane defined by surface A. If the base member 17 is secured to the magnetic chuck 13 by the surface D, the face of the tool will have a back-rake angle $m$ and a side-rake angle $n$. The bottom surface F corresponds to the surface D, but is opposite hand so that the side-rake angle of the face slopes in a direction opposite to that provided by the surface D.

As mentioned above, the flank surfaces of the tool point are formed by attaching the base member 17 by certain of its end and side surfaces G–K to the magnetic chuck 13. The side flank surfaces of the cutting tool are ground by laying the tool fixture 11 on first one side surface I and then on the other side surface K on the magnetic chuck 13. As shown in FIGURE 5, the side surfaces I, K each form an angle $p$ with a line parallel to the longitudinal centerline of the base member 17 measured in a plane parallel to the bottom surface A. The angle $p$ of the surfaces K and I corresponds to the clearance angle $h$ of the cut-off and grooving tool 40. As shown in FIGURE 4, the side surfaces K and I of the base member 17 form an angle $q$ with a line drawn perpendicular to the bottom surface A measured in a plane at right angles to the centerline of the base member 17. The angle $q$ formed by the surfaces K and I is the side-relief angle $f$ of the cut-off tool 40.

The end flank surface 47 of the square-shaped point of cut-off and grooving tool 40 is ground by setting the tool grinding fixture back on the end surface G. The surface G makes an angle $o$ (FIGURE 1) with a line perpendicular to the bottom surface A measured in a plane parallel to the centerline of the base member 17. If the base member 17 is clamped to the magnetic chuck by the surface G, the end-relief angle $g$ of the tool point will be the angle $o$.

A pointed cutting edge, such as that of threading tool 50, may also be formed on the end of the straight tool 40. In this case, the surface G is not used to cut the end-relief angle. To position the cutting tool to grind a pointed cutting edge the base member 17 is set back on the combination end and side surfaces H and J. In the form of the invention illustrated, the surface H and the opposite hand surface J are at a 30° angle to the surfaces I and K respectively, and provide a 60° V-shaped cutting end to the cutting tool. As shown in FIGURES 2 and 5, the surfaces J and H also slope backwardly towards the center of the base member to provide a relief angle similar to the angle $o$ of the surface G.

To form the left-bent tool of FIGURE 8, the clamping member 18 is secured to the base member 17 so that the tool blank is at an angle $t$ to the centerline of the base member 17. As illustrated the angle $t$ is approximately 30° to provide a 30° bent cutting tool. Having fixed the cutting tool at the angle $t$ the face and flank surfaces of the point of tool 50 are ground by positioning the base member 17 on the magnetic chuck 13 in substantially the same sequence of steps required to form these surfaces on the straight cutting tool of FIGURE 7. The face 51 of the tool 50 is ground by clamping the base member 17 to the magnetic chuck 13 by any one of the bottom surfaces A–F depending upon the back and side-rake angles desired. After grinding the face 51, the base member 17 is turned first on its side surface K and then on its side surface I to grind the side flank surfaces 53, 53 respectively. Then, if a pointed cutting edge is desired, the base member 37 is clamped to the magnetic chuck 13 first by the surface H and then by the surface J to grind the end flank surfaces 55, 54, respectively. If a square-shaped cutting edge is desired, the base member 17 is set back on its end surface G rather than the surfaces H and J to grind the end flank surface of the cutting tool.

If a right-bent tool is desired rather than the left-bent tool shown, the clamping member 18 is located relative to the base member 17 in the opposite hand position to that shown in FIGURE 3. In this position the locating pin 32 seats in the locating hole 36 rather than in the locating hole 34.

FIGURE 9 illustrates an alternate clamping member 68 for use with the tool grinding fixture 11. The clamping member 68 is used to grind the face and flank surfaces onto the point of a piece of tool steel 70 which is to be held by an angle tool holder when in use. The clamping member 68 includes a cutting tool-receiving passageway 73 which is stepped on both sides of its lower portion 74. When the cutting tool 70 is clamped to the stepped portion 74, the base of the cutting tool 70 is at an angle $v$ to the bottom surface of the base member 17. The angle $v$ is the angle of the particular tool holder in which the cutting tool 70 is to be held when in use. The angle clamping member 68 is substantially identical to the clamping member 18 in all other respects.

The angle clamping member 68 does not change the method of sharpening the face and flank surfaces from that used with the conventional clamping member 18. The face and flank surfaces are sharpened by clamping the base member 17 to the magnetic chuck in identically the same positions used for grinding or sharpening the straight cutting tool of FIGURE 7, or the bent cutting tool of FIGURE 8.

As should now be evident, the tool grinding fixture of the invention is extremely simple, both in construction and in use. There are no intricate or delicate mechanisms to be set and maintained at such setting. There are no moving parts between which there may be play or which may wear and increase the play such that it is impossible to hold or even obtain an accurate setting. The tool grinding fixture is virtually indestructible and will be usable to accurately grind and sharpen cutting tools beyond the lifetime of several users.

In the tool grinding fixture of the present invention there are no movable or rotating parts which must be set and reset for each point surface to be ground. The present tool fixture is merely repositioned from one surface to another to quickly grind all of the point surfaces, thus assuring an accurate positioning of the cutting tool relative to the grinding wheel for each such point surface and sharply reducing the time normally required to grind all of the point surfaces. It has been found that the bent tool of FIGURE 8 which normally takes approximately 45 minutes to grind by hand may be ground in only 7 minutes by using the tool fixture of this invention.

Although the invention is described in detail by the specification it is believed to comprise essentially a base member adapted to be clamped to a magnetic chuck and a clamping member for fixedly secure a cutting tool to the base member; wherein the base member is provided with a plurality of bottom, side, and end surfaces, each at a preselected angle relative to the base of the tool and to each other so that the face and flank surfaces of the cutting tool may be ground or sharpened by consecutively positioning the base member by selected ones of such surfaces to the magnetic chuck.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tool grinding fixture to be secured on a holding surface so as to position the point of a cutting tool against a grinding surface in all the positions necessary to grind the several surfaces of the point, said fixture comprising:
    (a) a base member having an upper mounting surface, and bottom, side, and end surfaces defining different planes at predetermined angles to an imaginary plane passing through the centerline of the base member and intercepting the side and end surfaces;
    (b) a clamping member mounted on said mounting surface, said clamping member including cutting tool mounting means for receiving the shank of the cutting tool and releasably securing said cutting tool to said clamping member with the point of the cutting tool facing away from said end surface and with the base of the cutting tool facing toward said bottom surface and being parallel to said imaginary plane;

(c) the predetermined angles of the planes defined by said bottom, side, and end surfaces being respectively related to the back and side rake angles, the side relief and side clearance angles, and the end relief angle of the face, side flank, and end flank surfaces respectively, to be ground on the point of the cutting tool so that alternately securing said base member to the holding surface by its bottom, side, and end surfaces selectively positions the cutting tool point for grinding its face, side flank, and end flank surfaces;

(d) said clamping member being rotatable on said mounting surface to rotate the cutting tool in a plane parallel to said imaginary plane between a position parallel to said centerline and positions at angles to said centerline; and, (e) locking means carried by one of said members and engaging the other of said members to releasably lock said clamping member to said mounting surface in any one of the cutting tool positions so that when said cutting tool is parallel to said centerline a straight point is ground on said cutting tool and when said cutting tool is in a position at an angle to said centerline a bent point is ground on the cutting tool.

2. The combination of claim 1, including in combination:

(f) one of said members carrying a locating projection and the other of said members having locating recesses at each of said cutting tool positions for receiving said locating projection and positioning said cutting tool at predetermined angles relative to said centerline.

3. The combination of claim 1, including in combination:

(f) said cutting tool mounting means including a cutting tool receiving opening, said opening including steps on each side thereof, a step on one side pairing with a step on the other side to provide a support upon which the shank of the cutting tool rests.

4. The combination of claim 2 including, in combination:

(g) said cutting tool mounting means including a cutting tool receiving opening, said opening including steps on each side thereof, a step on one side pairing with a step on the other side to provide a support upon which the shank of the cutting tool rests.

5. A tool grinding fixture to be secured on a holding surface so as to position the point of a cutting tool against a grinding surface in all the positions necessary to grind the several surfaces of the point, said fixture comprising:

(a) a base member having an upper mounting surface, and bottom, side, and end surfaces defining different planes at predetermined angles to an imaginary plane passing through the centerline of the base member and intercepting the side and end surfaces;

(b) a clamping member mounted on the mounting surface of said base member, said clamping member including cutting tool mounting means for receiving the shank of the cutting tool and releasably securing said cutting tool to said clamping member with the point of the cutting tool facing away from said end surface and with the base of the cutting tool facing towards said bottom surface and at an angle ($v$) to said imaginary plane wherein said angle ($v$) is the angle of a tool holder in which the cutting tool is held when in use;

(c) the predetermined angles of the planes defined by said bottom, side and end surfaces being respectively related to the back and side rake angles, the side relief and side clearance angles, and the end relief angle of the face, side flank, and end flank surfaces respectively, to be ground on the point of the cutting tool so that alternately securing said base member to the holding surface by its bottom, side, and end surfaces selectively positions the cutting tool point for grinding its face, side, flank and end flank surfaces;

(d) said clamping member being rotatable on said mounting surface to rotate the tool in a plane at said angle ($v$) to said imaginary plane between a position parallel to the centerline of said base member and positions at angles to said centerline; and, (e) locking means carried by one of said members and engaging the other of said members to releasably lock said clamping member to said mounting surface in any one of the cutting tool positions so that when said cutting tool is parallel to said centerline a straight point is ground on said cutting tool and when said cutting tool is in a position at an angle to said centerline a bent point is ground on the cutting tool.

6. The combination of claim 5, including, in combination;

(f) one of said members carrying a locating projection and the other of said members having locating recesses at each of said cutting tool positions for receiving said locating projections and positioning said cutting tool at predetermined angles relative to said centerline.

7. The combination of claim 6 including, in combination:

(g) said cutting tool mounting means including a cutting tool receiving opening, said opening including steps on each side thereof, a step on one said pairing with a step on the other side to provide a support upon which the shank of the cutting tool rests.

8. A tool grinding fixture to be secured on a holding surface so as to position the point of a cutting tool against a grinding surface in all the positions necessary to grind the several surfaces of the point, said fixture comprising:

(a) a base member having an upper mounting surface, and bottom, side and end surfaces defining different planes at predetermined angles to an imaginary plane passing through the centerline of the base member and intercepting said side and end surfaces;

(b) said base member having:

(i) the plane defined by the bottom surface being at first and second angles to said imaginary plane, said first angle as measured in a plane at right angles to the centerline of the base member being the side rake angle of the face to be ground on the point, and said second angle as measured in a plane parallel to the centerline of the base member and perpendicular to the imaginary plane being the back rake angle of the face desired to be ground on the point;

(ii) the plane defined by said side surface being at first and second angles to the imaginary plane, such first angle as measured in a plane at right angles to the centerline of the base member being 90° minus the side relief angle of the side flank surfaces to be ground on the point, such second angle as measured in a plane parallel to the centerline and parallel to the imaginary plane being the side clearance angle of the side flank surface to be ground on the point;

(iii) the plane defined by said end surface being at an angle to said imaginary plane, such latter latter angle as measured in a plane parallel to the centerline of the base member and at right angles to the imaginary plane being 90° minus the end relief angle of the end flank surface to be ground on the point;

(c) a clamping member mounted on said mounting surface, said clamping member including cutting tool mounting means for receiving the shank of the cutting tool and releasably securing said cutting tool to said clamping member with the point of the cutting tool facing away from said end surface and with the base of the cutting tool facing toward said bottom surface and being parallel to said imaginary plane;

(d) said clamping member being rotatable on said mounting surface to rotate the cutting tool in a plane parallel to said imaginary plane between a position parallel to said centerline and positions at angles to said centerline; and, (e) locking means carried by one of said members and engaging the other of said members to releasably lock said clamping member to said mounting surface in any one of the cutting tool positions so that when the cutting tool is parallel to said centerline, a straight point is ground on the cutting tool and when said cutting tool is in a position at an angle to said centerline a bent point is ground on the cutting tool.

9. A tool grinding fixture to be secured on a holding surface so as to position the point of a cutting tool against a grinding surface in all the positions necessary to grind the several surfaces of the point, said fixture comprising:

(a) a base member having an upper mounting surface, and bottom, side, and end surfaces defining different planes at predetermined angles to an imaginary plane passing through the centerline of the base member and intercepting said side and end surfaces;

(b) said base member having:
  (i) the plane defined by the bottom surface being at first and second angles to said imaginary plane, said first angle as measured in a plane at right angles to the centerline of the base member being the side rake angle of the face to be ground on the point, and said second angle as measured in a plane parallel to the centerline of the base member and perpendicular to the imaginary plane being the back rake angle of the face desired to be ground on the point;
  (ii) the plane defined by said side surface being at first and second angles to the imaginary plane, such first angle as measured in a plane at right angles to the centerline of the base member being 90° minus the side relief angle of the side flank surfaces to be ground on the point, such second angle as measured in a plane parallel to the centerline and parallel to the imaginary plane being the side clearance angle of the side flank surface to be ground on the point;
  (iii) the plane defined by said end surface being at an angle to said imaginary plane, such latter angle as measured in a plane parallel to the centerline of the base member and at right angles to the imaginary plane being 90° minus the end relief angle of the end flank surface to be ground on the point;

(c) a clamping member mounted on said mounting surface, said clamping member including cutting tool mounting means for receiving the shank of the cutting tool and releasably securing said cutting tool to said clamping member with the point of the cutting tool facing away from said end surface and with the base of the cutting tool facing towards said bottom surface and at an angle (v) relative to said imaginary plane wherein said angle (v) is the angle of a tool holder in which the cutting tool is held when in use;

(d) said clamping member being rotatable on said mounting surface to rotate the tool in a plane at said angle (v) to said imaginary plane between a position parallel to the centerline of said base member and positions at angles to said centerline; and, (e) locking means carried by one of said members and engaging the other of said members to releasably lock said clamping member to said mounting surface in any one of the cutting tool positions so that when said cutting tool is parallel to said centerline a straight point is ground on said cutting tool and when said cutting tool is in a position at an angle to said centerline a bent point is ground on the cutting tool.

10. A tool grinding fixture to be secured on the holding surface so as to position the point of a cutting tool against a fixed grinding surface in all the positions necessary to grind the several surfaces of the point for straight and bent cutting tools, comprising:

(a) a base member having an upper mounting surface, and bottom, side, and end surfaces defining different planes at predetermined angles to an imaginary plane passing through the centerline of the base member and intercepting said side and end surfaces;

(b) said base member having;
  (i) the plane defined by the bottom surface being at first and second angles to said imaginary plane, said first angle as measured in a plane at right angles to the centerline of the base member being the side rake angle of the face to be ground on the point, and said second angle as measured in a plane parallel to the centerline of the base member and perpendicular to the imaginary plane being the back rake angle of the face desired to be ground on the point;
  (ii) the plane defined by said side surface being at first and second angles to the imaginary plane, such first angle as measured in a plane at right angles to the centerline of the base member being 90° minus the side relief angle of the side flank surfaces to be ground on the point, such second angle as measured in a plane parallel to the centerline and parallel to the imaginary plane being the side clearance angle of the side flank surface to be ground on the point;
  (iii) the plane defined by said end surface being at an angle to said imaginary plane, such latter angle as measured in a plane parallel to the centerline of the base member and at right angles to the imaginary plane being 90° minus the end relief angle of the end flank surface to be ground on the point;

(c) a clamping member mounted on the mounting surface of said base member, said clamping member including:
  (i) an opening for receiving the shank of a cutting tool;
  (ii) a tool positioning surface within said opening upon which the base of the cutting tool rests, said positioning surface defining a plane parallel to said imaginary plane so as to position the base of said cutting tool parallel to said imaginary plane; and,
  (iii) an adjustable clamping element to releasably clamp said cutting tool against said positioning surface with its base facing said bottom surface;

(d) said clamping member being rotatable on said mounting surface to rotate the cutting tool in a plane parallel to said imaginary plane between a position parallel to said centerline and positions at angles up to 90° relative to said centerline;

(e) a locating projection carried by one of said members and locating recesses carried by the other of said members, said locating recesses being located at points around the axis of relative member rotation, said axis of rotation and at least one of said locating recesses defining a line parallel to said centerline, said axis of rotation and another of said recesses defining a line at a predetermined angle to said centerline, and the latter predetermined angle being the desired bent tool angle;

(f) said locating projection coacting alternately with individual locating recesses when said clamping member is rotated relative to said base member to accurately locate said clamping member at each of the cutting tool positions relative to said centerline; and, (g) locking means carried by one of said members and engageable with the other of said members to prevent further relative member rotation when said clamping member is placed in one of said cutting tool positions.

11. The combination of claim 10 wherein said cutting tool receiving opening includes steps on each side of said opening, the steps on one side pairing with steps on the other side to provide a plurality of tool positioning surfaces each of which accommodates a different size tool shank.

12. A tool grinding fixture to be secured on the holding surface so as to position the point of a cutting tool against a fixed grinding surface in all the positions necessary to grind the several surfaces of the point for straight and bent cutting tool to be held in angle tool holders, comprising:

(a) a base member having an upper mounting surface, and bottom, side, and end surfaces defining different planes at predetermined angles to an imaginary plane passing through the centerline of the base member and intercepting said side and end surfaces;

(b) said base member having:
  (i) the plane defined by the bottom surface being at first and second angles to said imaginary plane, said first angle as measured in a plane at right angles to the centerline of the base member being the side rake angle of the face to be ground on the point, and said second angle as measured in a plane parallel to the centerline of the base member and perpendicular to the imaginary plane being the back rake angle of the face desired to be ground on the point;
  (ii) the plane defined by said side surface being at first and second angles to the imaginary plane, such first angle as measured in a plane at right angles to the centerline of the base member being 90° minus the side relief angle of the side flank surfaces to be ground on the point, such second angle as measured in a plane parallel to the centerline and parallel to the imaginary plane being the side clearance angle of the side flank surface to be ground on the point;
  (iii) the plane defined by said end surface being at an angle to said imaginary plane, such latter angle as measured in a plane parallel to the centerline of the base member and at right angles to the imaginary plane being 90° minus the end relief angle of the end flank surface to be ground on the point;

(c) a clamping member mounted on the mounting surface of said base member, said clamping member including:
  (i) an opening for receiving the shank of a cutting tool;
  (ii) a tool positioning surface within said opening upon which the base of the cutting tool rests, said positioning surface defining a plane at an angle ($v$) relative to said imaginary plane so as to position the base of said cutting tool at the angle ($v$) to said imaginary plane, said angle ($v$) being the angle of the tool holder; and,
  (iii) an adjustable clamping element to releasably clamp said cutting tool against said positioning surface with its base facing said bottom surface;

(d) said clamping member being rotatable on said mounting surface to rotate the cutting tool in a plane parallel to said imaginary plane between a position parallel to said centerline and positions a angles up to 90° relative to said centerline;

(e) a locating projection carried by one of said members and locating recesses carried by the other of said members, said locating recesses being located at points around the axis of relative member rotation, said axis of rotation and at least one of said locating recesses defining a line parallel to said centerline, said axis of rotation and another of said recesses defining a line at a predetermined angle to said centerline, and the latter predetermined angle being the bent tool angle;

(f) said locating projection coacting alternately with individual locating recesses when said clamping member is rotated relative to said base member to accurately locate said clamping member at each of the cutting tool positions relative to said centerline; and, (g) locking means carried by one of said members and engageable with the other of said members to prevent further relative member rotation when said clamping member is placed in one of said cutting tool positions.

13. The combination of claim 12 wherein said cutting tool receiving opening includes steps on each side of said opening, the steps on one side pairing with steps on the other side to provide a plurality of said tool positioning surfaces each of which accommodates a different size tool shank.

14. A tool grinding fixture to be secured on a holding surface for positioning the point of a cutting tool against a grinding surface to grind the several surfaces of a square point cutting tool including side clearance angles "$h$" and side relief angles "$f$," said fixture comprising:

(a) a base member having an upper cutting tool mounting surface and bottom, end, and side surfaces;

(b) clamping means for securing a cutting tool to said tool mounting surface with the point of the tool directed away from said end surface;

(c) said end and bottom surfaces defining planes extending at angles relative to said cutting tool such that when they are held on the holding surface they position the point for grinding the end flank and face surfaces of the point respectively;

(d) said side surfaces converging away from said bottom surface and toward said cutting tool mounting surface at equal angles "$h$" for positioning the cutting tool for grinding the side flank surfaces with side relief angles "$h$;" and, (e) said side surfaces also converging away from said end surface and toward the point of a tool secured to the mounting surface at equal angles "$f$" each for positioning the cutting tool for grinding the side flank surfaces with side clearance angles "$f$."

15. A tool grinding fixture to be secured on a holding surface so as to position the point of a cutting tool against a grinding surface in all the positions necessary to grind the several surfaces of the point, said fixture comprising:

(a) a base member having a cutting tool mounting surface and bottom, end, and side surfaces;

(b) clamping means for securing a cutting tool to said tool mounting surface with the point of the tool directed away from said end surface;

(c) said end and side surfaces defining planes extending at angles relative to said cutting tool such that when abutted against the holding surface they position the point of grinding the end flank and side flank surfaces of the tool point respectively;

(d) said bottom surface defining a plane disposed at an angle "$d$" relative to said mounting surface wherein the angle "$d$" is measured in a plane passing through the centerline of the base member and at an angle "$j$" relative to said mounting surface when the angle "$j$" is measured in a plane perpendicular to said centerline whereby said bottom surface positions the cutting tool for grinding the face surface with a back rake angle "$d$" and a side rake angle "$j$."

16. A tool grinding fixture to be secured on a holding surface so as to position the point of a cutting tool against a grinding surface in all the positions necessary to grind the several surfaces of the point, said fixture comprising:

(a) a base member having a cutting tool mounting surface and bottom, end, and side surfaces;

(b) clamping means for securing a cutting tool to said tool mounting surface with the point of the tool directed away from said end surface;

(c) said end and side surfaces defining planes extending at angles relative to said cutting tool such that when abutted against the holding surface they position the point for grinding the end flank and side flank surfaces of the tool point respectively; and, (d) said bottom surface having:
  (i) a first planar area defining a plane which is parallel to said mounting surface;
  (ii) a second planar area defining a plane which is at an angle "$d$" relative to said mounting surface as measured in a plane passing through the centerline of the base member; and,
  (iii) a third planar area defining a plane which is at an angle "$j$" relative to the mounting surface as measured in a plane perpendicular to the centerline of said base member.

17. The device of claim 16 wherein said bottom surface includes a fourth planar area defining a plane which is at both said angles "$d$" and "$j$."

18. The device of claim 17 wherein said first planar area extends from said end surface forwardly to approximately a midpoint of the base, said second planar area extends from said first planar area forwardly to a forward surface of said base member, two of said third planar areas are disposed on either side of said first planar area and extend upwardly at said angle "$j$," and two of said fourth planar areas are disposed on either side of said second planar areas and extend upwardly and forwardly at said angles "$d$" and "$j$."

References Cited by the Examiner

UNITED STATES PATENTS 2,385,902 10/1945 Wilson _____ 51—220
2,873,562 2/1959 Stanford et al. _____ 51—220

ROBERT C. RIORDON, *Primary Examiner.*

LESTER M. SWINGLE, *Examiner.*